July 8, 1969   J. D. MORTON   3,454,182
VENT GROMMETS

Filed Sept. 30, 1965   Sheet 1 of 2

INVENTOR
JAMES D. MORTON
BY
Gravely, Lieder & Woodruff
ATTORNEYS

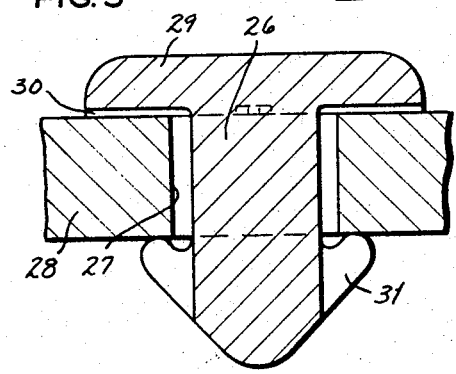
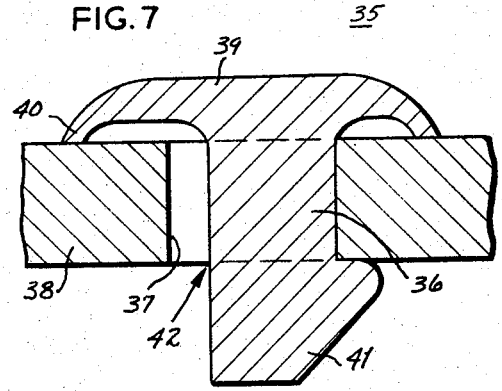
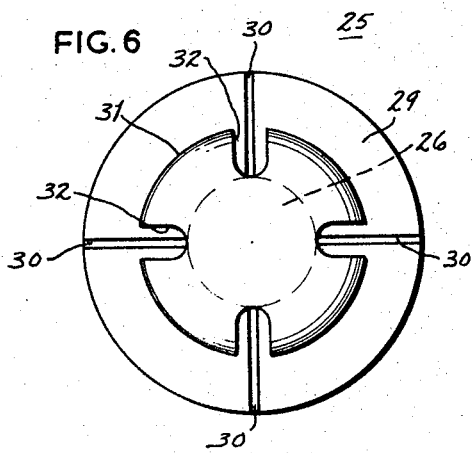
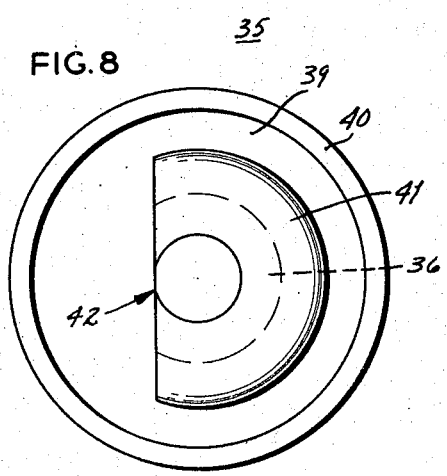

United States Patent Office 3,454,182
Patented July 8, 1969

1

3,454,182
VENT GROMMETS
James D. Morton, Canton, Ohio, assignor to The Timken Roller Bearing Company, Canton, Ohio, a corporation of Ohio
Filed Sept. 30, 1965, Ser. No. 491,733
Int. Cl. B65d 51/16
U.S. Cl. 220—44                    2 Claims

---

ABSTRACT OF THE DISCLOSURE

A vent grommet formed of resilient material so as to be capable of being force fitted through an opening in a rigid wall which is the bearing seal case of a railway car journal, the vent grommet being formed with restricted passage means which is capable of venting air but blocks the passage of liquid and solids because of the capillarity character of liquids, thereby preventing the passage of undesirable foreign material while easily permitting equalization of pressure.

---

Figure 1:
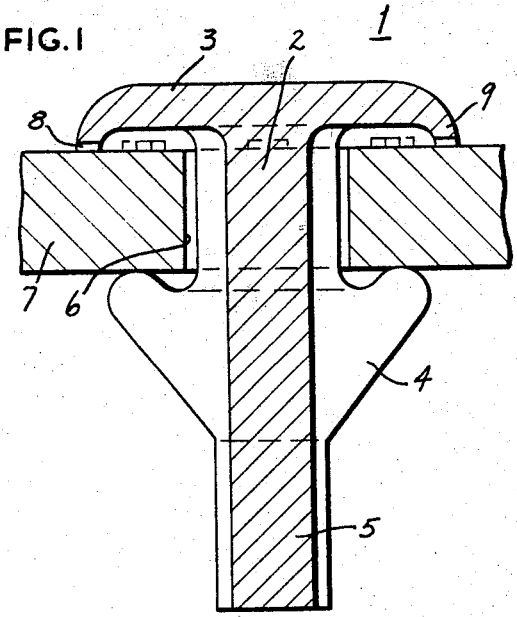

This invention relates to vent grommets and more particularly for vent grommets made of resilient material which may be forced through a hole in a bearing seal case of a railway car journal to provide a tight fitting vent grommet to exclude dirt or water from the journal bearing. Furthermore, the invention relates to vent grommets of resilient material which may operate as a vent or flap valve.

Various vent members have been proposed in the past for various uses including venting bearing seal cases of railway car journals, however, most such vent members include axial passages through the member, and lack positive fitting in the seal case, and are subject to vibrating loose.

The present invention provides vent grommets which overcome various difficulties of such prior vent members. Essentially, the vent grommets appertaining to the invention include a body portion having longitudinally extending surface recesses or slots, a head portion having radially extending transverse recesses or slots on the underside thereof, and an anchor member having longitudinally extending surface slots communicating with the radial slots on the body portion. The body portion of the vent grommets are made to snugly fit within a hole in a seal case with the anchor member applying a positive tension between the vent grommet head and seal casing. Thus, the vent grommet is held securely in an aperture in the bearing seal case and cannot vibrate loose.

It is therefore an object of the invention to provide a vent grommet which fits snugly in a vent aperture and resists vibration which would tend to loosen the vent grommet in the vent aperture.

It is another object of the invention to provide a vent grommet of resilient material which snugly fits within a vent aperture and resists vibration.

It is another object of the invention to provide a vent grommet having a body portion including a longitudinally extending surface slot communicating with radially extending transverse slots in a head portion of the grommet.

It is another object of the invention to provide a flap valve of resilient material having a body portion including a longitudinally extending surface slot to provide a valve port, and maintain a snug fit in a seal case.

It is another object of the invention to provide a snug fitting vent grommet of resilient material for installation in a seal case which aids in excluding all dust particles and moisture from entering the seal case.

It is another object of the invention to provide a resilient vent grommet having a central body portion including

2 longitudinally extending surface recesses, a circular head portion including radially extending transverse recesses communicating with the longitudinal recesses of the body portion, and a frustro-conical enlarged anchor portion having longitudinally extending surface recesses communicating with the surface recesses in the central body portion.

Figure 3:
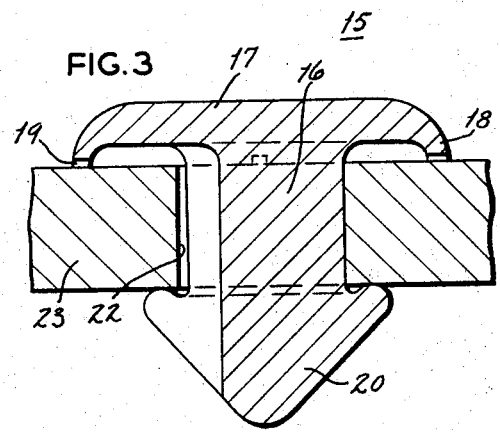
Figure 2:
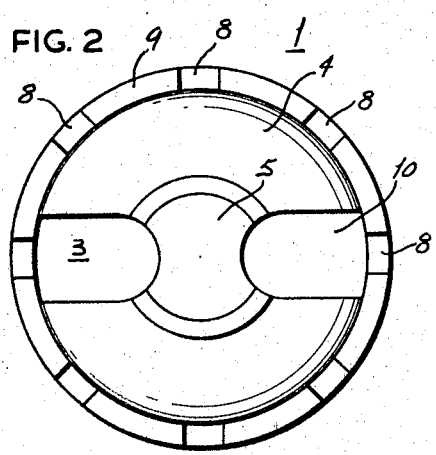
Figure 4:
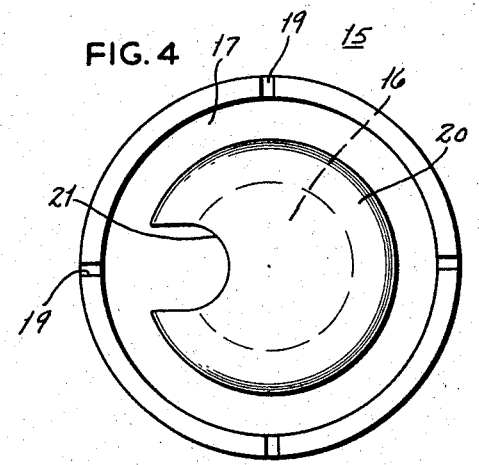

These and other objects and advantages of the invention will become readily apparent from the ensuing description taken in conjunction with the appended claims and the drawings, wherein:

FIG. 1 illustrates in cross section one embodiment of the vent grommet installed in an aperture in a seal case;
FIG. 2 is a bottom view of the grommet illustrated in FIG. 1 without the seal case;
FIG. 3 illustrates in cross section another embodiment of the vent grommet appertaining to the invention installed in an aperture in a seal case;
FIG. 4 is a bottom view of the grommet illustrated in FIG. 3 without the seal case;
FIG. 5 is still another embodiment of the grommet appertaining to the invention illustrated in cross section installed in a seal case;
FIG. 6 is a bottom view of the vent grommet illustrated in FIG. 5;
FIG. 7 illustrates in cross section the flap valve embodiment of the invention installed in a seal case; and
FIG. 8 illustrates a bottom view of the flap valve of FIG. 7 without the seal case.

Referring now to the drawings and in particular to FIGS. 1 and 2, a vent grommet generally referred to by the numeral 1 has a body portion 2 with an integral mushroom head 3 and an integral anchor portion 4. The anchor portion 4 has an integral stem 5 which aids in installing the grommet 1 through an aperture or hole 6 in seal case 7. The peripheral edge of the mushroom head 3 has a series of radial slots 8 which provide a vent passage to the atmosphere from the underneath side. The anchor portion 4 and the body portion 2 of the vent grommet 1 define a longitudinally extending surface recess or slot 10 which provides a vent passage from within the seal case 7 to the underside of the mushroom head 3, thus completing a through passageway from within the seal case 7 to the environment outside the seal case. The vent grommet 1 is constructed such that the grommet could be installed by pulling on the stem 5 until the anchor member 4 clears the inside of the seal case 7. The dimension of the grommet between the mushroom head 3 and the seating portion of the anchor 4 is such that a constant tension is applied to seat mushroom head 3 against seal case 7 and to prevent the grommet from vibrating loose. Moreover, the body portion 2 of the vent grommet 1 has a diameter sufficient to snugly fit the aperture 6 in the seal case 7.

Referring now to FIGS. 3 and 4, another vent grommet generally denoted by the number 15 is illustrated. The grommet 15 is generally similar to grommet 1. The grommet 15 has a body portion 16 and a mushroom head portion 17 having a peripheral rim 18 which has a series of radial recesses or slots 19. A frustro-conical enlarged anchor portion 20 is formed integral with the body 16. The body portion 16 and anchor portion 20 define a longitudinally extending surface recess or slot 21 which provides an air passage through bore 22 of seal case 23 which communicates with the underside of mushroom head 17 and the environment outside the seal case through radial slots 19. It will be understood that the diameter of body portion 16 is sufficient to fit tightly in bore 22 of seal case 23. Likewise, the length of body 16 is such that peripheral rim 18 of mushroom head 17 is firmly seated against the outside surface of seal case 23 and maintained in that position by anchor 20. It will be appreciated that the construction of vent 15 provides an excellent vent passage between the inside and outside of seal case 23 which avoids the problem of vibrating loose as well as emitting dust and moisture within the seal case 23.

Referring now to FIGS. 5 and 6, another vent grommet generally designated 25 appertaining to the invention is provided. Grommet 25 has a body portion 26 which has a slightly smaller diameter than the diameter of aperture 27 in seal case 28. Grommet 25 has a flat head 29 which has a series of radial recesses or slots 30 extending from the body portion 26 to the border of the head 29. The grommet 25 has an anchor portion 31 integral with body portion 26. The anchor 31 is of an enlarged frustroconical shape. The anchor portion 31 defines longitudinally extending surface recesses or slots 32 which communicate with slots 30 in the underside of flat head 29. It will be appreciated that flat head 29 seats against the outer surface of seal case 28, and is firmly held by the anchor portion 31 thereagainst. Thus, the vent passage from inside of seal case 28 to the environment outside of the seal case is provided by the slots in anchor portion 31, the spacing between the aperture 27 and the lesser diameter body portion 26, and the radial slots 30 in the underside of flat head 29.

Referring now to FIGS. 7 and 8, a flap valve generally referred to by the numeral 35 embodying the principles of the invention includes a body portion 36 having a diameter equal to the diameter of bore 37 in seal case 38. A mushroom head 39 having a peripheral rim 40 is formed integral with body 36. A wedge-shaped anchor 41 is provided integral with body portion 36. The body portion 36 and anchor portion 41 have a flat or cutaway side 42 which provides a passageway from the inside of seal case 38 to the underneath side of mushroom head 39. It will be understood that peripheral rim 40 does not have any slots to provide a constant venting passageway. However, the thickness of head 39 is such that peripheral rim 40 will yield under pressure at the underneath side of head 39 to provide one-way flow from within seal case 38 to the environment outside the sealed housing. The length of body portion 36 is of such a dimension as to provide a good seal between peripheral rim 40 and the outside surface of seal case 38 maintained by anchor member 41. The pressure differential at which peripheral rim 40 will yield or flap is determined by the thickness of mushroom head 39.

It will be appreciated that the invention has been disclosed with various embodiments thereof which are exemplary of the invention and do not limit the invention to any particular construction. Moreover, it will be readily understood and appreciated that the vent grommets may be modified to provide flap valves and that the flap valve 35 may be modified by providing radial slots in the peripheral rim 40 to operate as a vent member. Furthermore, it will be appreciated that the grommets appertaining to the invention may be made of any suitable resilient material and provide the unique features of a vent grommet or flap valve which are not subject to being displaced by shock or vibration in operation, and are simple and easy to manufacture and install in the seal case. Moreover, it will be understood that the vent members and flap valve may be utilized in other applications than in a railway car journal seal case.

What is claimed is:

1. A vent grommet for a seal supporting housing to allow communication between the housing interior and the exterior of the housing, the housing having a rigid wall formed with an opening to receive the vent grommet, said grommet comprising: a body of resilient material having an enlarged head exposed at the exterior of the housing to completely cover the wall opening, a stem projecting inwardly from said head and snugly fitting within the wall opening and an anchor element on said stem in position at the interior of the housing wall to engage the wall opposite said head and being sufficiently flexible to pass through the wall opening, the spacing along the axis of said stem between said enlarged head and said anchor element being less than the rigid wall thickness at the opening; and means in said grommet allowing free passage of air excluding liquids and foreign matter, said means comprising at least one normally constantly open passage directed lengthwise of said body stem to open within the seal housing adjacent said anchor element and said passage continuing under said head and opening to a cavity under said enlarged head and from which at least one radial passage opens outwardly to the exterior of the housing.

2. The vent grommet for a seal supporting housing as set forth in claim 1, wherein said stem projects inwardly beyond said anchor element to provide an extension on the said body of resilient material to facilitate mounting said body in the opening of the rigid wall.

References Cited

UNITED STATES PATENTS

| | | |
|---|---|---|
| 2,769,457 | 11/1956 | Wittenberg _____ 137—513.5 X |
| 641,011 | 1/1900 | Heidel. |
| 2,224,296 | 12/1940 | Hoffman. |
| 2,571,893 | 10/1951 | Kendall _____ 137—525 X |
| 2,638,263 | 5/1953 | Jesnig _____ 220—44 X |
| 2,715,980 | 8/1955 | Frick _____ 137—525 X |
| 2,775,363 | 12/1956 | Taylor _____ 220—44 |
| 2,933,102 | 4/1960 | Hillman et al. _____ 220—44 X |
| 3,159,176 | 12/1964 | Russell et al. _____ 137—525.1 |
| 3,297,048 | 1/1967 | Imhof _____ 137—525 X |

WILLIAM F. O'DEA, *Primary Examiner.*

DAVID J. ZOBKIW, *Assistant Examiner.*

U.S. Cl. X.R.

137—517, 525, 525.3, 513.5